US008230780B2

(12) United States Patent
Sasine et al.

(10) Patent No.: US 8,230,780 B2
(45) Date of Patent: *Jul. 31, 2012

(54) METHOD AND PROCESS OF COLLECTING AND PROCESSING RECYCLABLE WASTE

(75) Inventors: John Sasine, South Jordan, UT (US);
Charles Jongert, Sandy, UT (US);
Marvin Acey, South Jordan, UT (US);
Jeffery A. Ashby, Taylorsville, UT (US)

(73) Assignee: Paper and Plastic Partnership, LLC, Salt Lake City, UT (US)

( * ) Notice: Subject to any disclaimer, the term of this patent is extended or adjusted under 35 U.S.C. 154(b) by 132 days.

This patent is subject to a terminal disclaimer.

(21) Appl. No.: 12/644,576

(22) Filed: Dec. 22, 2009

(65) Prior Publication Data

US 2010/0095855 A1 Apr. 22, 2010

Related U.S. Application Data

(60) Division of application No. 12/245,239, filed on Oct. 3, 2008, now abandoned, which is a division of application No. 11/299,442, filed on Dec. 12, 2005, now abandoned, which is a continuation of application No. 11/166,516, filed on Jun. 24, 2005, now abandoned.

(60) Provisional application No. 60/617,971, filed on Oct. 11, 2004.

(51) Int. Cl.
*B65B 13/02* (2006.01)

(52) U.S. Cl. ........................................... 100/3

(58) Field of Classification Search .................. 100/2, 3, 100/35; 428/2; 206/83.5, 449, 451, 593; 53/438, 48.1, 48.4, 48.5, 48.9, 542, 543
See application file for complete search history.

(56) References Cited

U.S. PATENT DOCUMENTS

| 4,382,108 | A | | 5/1983 | Carroll |
|---|---|---|---|---|
| 4,682,699 | A | * | 7/1987 | Ertley ........................ 211/85.19 |
| 4,993,563 | A | | 2/1991 | Bolling |
| 5,129,329 | A | | 7/1992 | Clasen |
| 5,131,210 | A | | 7/1992 | Kiya |
| 5,239,919 | A | | 8/1993 | Maki |
| 5,392,912 | A | | 2/1995 | Grubbs |
| 6,131,376 | A | | 10/2000 | Grey |

(Continued)

FOREIGN PATENT DOCUMENTS

SE 502785 1/1996

OTHER PUBLICATIONS

U.S. Appl. No. 11/299,442, May 20, 2009, Office Action.

(Continued)

*Primary Examiner* — Jimmy T Nguyen
(74) *Attorney, Agent, or Firm* — Workman Nydegger

(57) ABSTRACT

Recyclable plastic film is efficiently collected for recycling at stores or other locations by compacting the plastic film as layers in plastic/cardboard bales. The plastic/cardboard bales can be formed using existing cardboard balers that stores typically already have for baling recyclable cardboard. In one embodiment, the plastic/cardboard bales are preferably formed with a bottom layer of cardboard, a middle layer of the recyclable plastic film, and a top layer of cardboard. The layered structure can be modified to omit one of the cardboard layers or to add additional plastic film and cardboard layers.

18 Claims, 8 Drawing Sheets

U.S. PATENT DOCUMENTS

| | | | |
|---|---|---|---|
| 6,274,637 B1 | 8/2001 | Schallenberg | |
| 6,821,595 B2 | 11/2004 | Murcia | |
| 7,412,397 B2 | 8/2008 | Grenchus | |
| 7,413,602 B2 | 8/2008 | Grasso | |
| 7,416,142 B2 | 8/2008 | Baker | |
| 7,416,462 B2 | 8/2008 | Noma | |
| 7,416,612 B1 | 8/2008 | Montie | |
| 7,416,641 B2 | 8/2008 | Denison | |
| 7,419,058 B2 | 9/2008 | Wening | |
| 7,784,399 B2 * | 8/2010 | Sasine et al. | 100/3 |
| 2003/0010669 A1 | 1/2003 | Simhaee | |
| 2007/0020410 A1 | 1/2007 | Sasine | |
| 2008/0217811 A1 | 9/2008 | Wolf | |
| 2008/0221228 A1 | 9/2008 | Notari | |
| 2009/0148629 A1 | 6/2009 | Sasine | |

OTHER PUBLICATIONS

U.S. Appl. No. 11/482,356, Dec. 16, 2008, Office Action.
U.S. Appl. No. 11/482,356, May 19, 2009, Office Action.
U.S. Appl. No. 11/482,356, Dec. 9, 2009, Office Action.
U.S. Appl. No. 12/245,239, May 20, 2009, Office Action.
U.S. Appl. No. 12/245,239, Nov. 24, 2009, Office Action.
U.S. Appl. No. 11/482,356, Jun. 29, 2010, Notice of Allowance.
U.S. Appl. No. 12/245,239, mailed Feb. 25, 2011, Office Action.
U.S. Appl. No. 12/333,175, mailed Oct. 4, 2011, Office Action.
U.S. Appl. No. 11/482,356, mailed Jun. 29, 2010, Notice of Allowance.
U.S. Appl. No. 12/333,175, mailed Mar. 15, 2012, Office Action.

* cited by examiner

METHOD AND PROCESS OF COLLECTING AND PROCESSING RECYCLABLE WASTE

CROSS REFERENCE TO RELATED APPLICATIONS

This application is a divisional of U.S. Utility Application No. 12/245,239, entitled METHOD AND PROCESS FOR COLLECTING AND PROCESSING RECYCLABLE WASTE, filed on Oct. 3, 2008 now abandoned, which is a divisional of U.S. Utility Application No. 11/299,442, now abandoned, entitled METHOD AND PROCESS OF COLLECTING AND PROCESSING RECYCLABLE WASTE, filed on Dec. 12, 2005, which is a continuation of United States Utility Application No. 11/166,516, now abandoned, entitled: "METHOD AND PROCESS OF COLLECTING AND PROCESSING RECYCLABLE WASTE," filed on Jun. 24, 2005, and which claims the benefit of U.S. Provisional Application No. 60/617,971, filed Oct. 11, 2004. This application claims the benefit and priority of all of the foregoing applications which are incorporated herein by reference in their entireties.

BACKGROUND OF THE INVENTION

1. The Field of the Invention

The present invention relates to the field of recycling. More particularly, the present invention relates to methods of collecting and processing recyclable plastic film waste through the formation of bales including both plastic and cardboard.

2. The Relevant Technology

The field of plastic recycling is increasingly important as the use of plastic wrap and plastic film bags permeate more and more aspects of retail sales as well as the shipping and packaging industry. For example, plastic shopping bags are well known to the general public as they are the predominant method for consumers to carry groceries and other purchased goods from a store. An even greater volume of plastic film, however, is generated for product packaging and distribution. For example, pallets of goods are frequently wrapped with large sheets of shrink wrap plastic to keep the content of the pallet from shifting or falling during transit. Another example is clothing distribution, wherein each garment is typically transported wrapped in its own plastic sleeve. Some estimates are that plastic bags on apparel account for over 60% of plastic waste at retail department stores.

With this proliferation of plastic wrap and plastic bags into the shipping and packaging industry, there is a need to recover this material out of the waste stream in an efficient and effective manner. Stores that aggressively collect and recycle waste plastic wrap and plastic bags separate from other garbage frequently save hundreds of dollars per month in the cost of trash hauling. Still, the storage, baling, shipping, and processing of the plastic is extremely inefficient under current methods.

At stores and distribution centers, for example, one conventional method of collecting plastic waste film for recycling is to stuff plastic into other large plastic bags and toss them somewhere in the facility in a haphazard fashion, for example on top of other bales or bins. For transportation, the bags are thrown into the back of a truck for transportation. Both of these methods are extremely inefficient uses of space.

Because of these challenges, the majority of plastic wrap and plastic bags are disposed of as waste. Not only does this add to pollution and more quickly fill landfills, but the plastic film fills on-site trash receptacles very quickly. Because waste is typically paid for by volume, i.e. the number of waste containers hauled off, the large volume of plastic film that is disposed of in on-site trash receptacles represent a significant cost. In addition, waste plastic film has a recycling value that is unrealized when the plastic film is disposed of in garbage.

Despite the challenges in collecting recyclable plastic film, uses for recyclable plastic are quickly expanding. For example, recycled plastic is now used in plastic garbage can liners, landfill liners, agricultural film, and composite lumber products for picnic tables, park benches, porches, and walkways where rot-resistant wood-like products are desired. Shipping containers, carpet materials, and hard plastic containers are also more and more frequently made with recycled plastic film. This increased demand for products made from recycled plastic is fueling an increased demand for the collection of recyclable plastic.

In addition, recent increases in the cost of raw petroleum have led to a dramatic increase in the cost of plastics for plastic products. As a result, the per pound value of collected recyclable plastic has also increased dramatically. This adds to the demand for the collection of recyclable plastic.

Nevertheless, the volume of plastic that is collected for recycling remains considerably lower than is feasible. One key imitation on the use of recyclable plastic is that plastic film is difficult and costly to collect. For example, consumers using small plastic bags rarely return them to a source whereby they can be recycled. In addition, shrink wrapped plastic and garment bags at department stores are often discarded rather than collected. In particular, garment bags and shrink wrapped plastic at department stores and warehouse stores are often discarded because the volume of space required to store all the plastic accumulated within the store becomes too expensive to dedicate to that purpose. Although there are feasible methods for collecting plastic film, such as dedicated plastic compactors and balers, these devices are too expensive and the volume of space that must be dedicated to storing precompacted plastic is usually impractical for most businesses.

By analogy, efforts at recycling cardboard have been much more successful. Cardboard recycling is performed at retailers, for example, by using large cardboard balers to compact waste cardboard and form the waste cardboard into bales for storage and transportation to cardboard recycling facilities. Cardboard balers are generally not used for plastic recycling, however, because they are much too large for the volume of plastic that is dealt with. Cardboard balers are typically designed to form forty-eight inch tall bales. The amount of loose plastic it would take to form a forty-eight inch tall bale simply cannot be stored by most, if not all, retailers. As a result, unlike cardboard, for which there is an efficient recycling infrastructure, there is currently no effective method for collecting large volumes of recyclable plastic.

In addition, plastic and cardboard cannot be mixed for recycling. This is because they are completely different materials that are recycled by very different processes. There are also no efficient methods to separate plastic and cardboard since the value of either material does not justify the labor. For this reason, it is well known that the presence of plastic film in a cardboard bale leads to rejection of the entire bale such that it is discarded rather than recycled.

Accordingly, it would represent an advance in the art to provide systems and methods to more efficiently and less expensively collect and process recyclable plastic for use in downstream recycling processes.

BRIEF SUMMARY OF THE INVENTION

The present invention relates to the collection of recyclable plastic film in bulk form. As noted above, the disposal or collection of plastic film from large retail stores, discount warehouses, and distribution centers has heretofore presented a significant cost to companies that made it inefficient or impractical. This difficulty in recovering recyclable plastic film results in the waste of a significant amount of otherwise recyclable plastic and reduces profits for those that do collect and recycle the plastic film.

These problems are overcome by the herein disclosed methods for the collection of plastic film within plastic/cardboard bales formed through novel methods of using balers such as conventional cardboard balers. In general, a plastic/cardboard bale is formed of layers of cardboard encompassing one or more layers of plastic. Thus, an amount of plastic insufficient to form a bale by itself is combined with one or more cardboard layers and compacted in a plastic/cardboard bale. As a result of these improved methods, a locale can use a cardboard baler not only to form cardboard bales, but also to form plastic/cardboard bales.

Accordingly, a first example embodiment of the invention is a method for collecting recyclable plastic. The method generally includes: providing a cardboard baler; placing a first layer of cardboard in the baler; placing a layer of recyclable plastic film in the baler on top of the first layer of cardboard, wherein the layer of recyclable plastic film has a thickness of at least about three inches; and operating the cardboard baler to form a bale formed of plastic and cardboard.

Another example embodiment of the invention is also a method for collecting recyclable plastic. This method generally includes: providing a cardboard baler; compacting a first layer of cardboard in the baler; compacting a layer of recyclable plastic film in the baler on top of the first layer of cardboard, wherein the layer of recyclable plastic film comprises a plurality of used plastic bags and/or plastic sheets and has a thickness of at least about three inches to about thirty-six inches; and compacting a second layer of cardboard over the plastic layer, whereby a bale is formed of plastic and cardboard, wherein the bale has a thickness of from about twenty-four inches to about sixty inches.

Yet another example embodiment of the invention is a bale formed of cardboard and recyclable plastic. The bale generally includes: a layer of recyclable plastic film, the layer of recyclable plastic film comprising first and second opposing surfaces, wherein the layer of recyclable plastic film comprises a plurality of used plastic bags and plastic sheets and has a thickness of at least about three inches; and a first layer of cardboard in contact with the first surface of the layer of recyclable plastic film, wherein the layer of recyclable plastic film and the first layer of cardboard are compactly bound together to facilitate transportation and storage. A second layer of cardboard can formed on and in contact with the second surface of the recyclable plastic film layer. Other cardboard and plastic film layers can also optionally be included in the bale.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the figures wherein like structures will be provided with like reference designations. It is understood that the drawings are diagrammatic and schematic representations of presently preferred embodiments of the invention, and are not limiting of the present invention nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of cardboard balers and recyclable plastics have not been described in particular detail in order to avoid unnecessarily obscuring the present invention.

Figure 1:
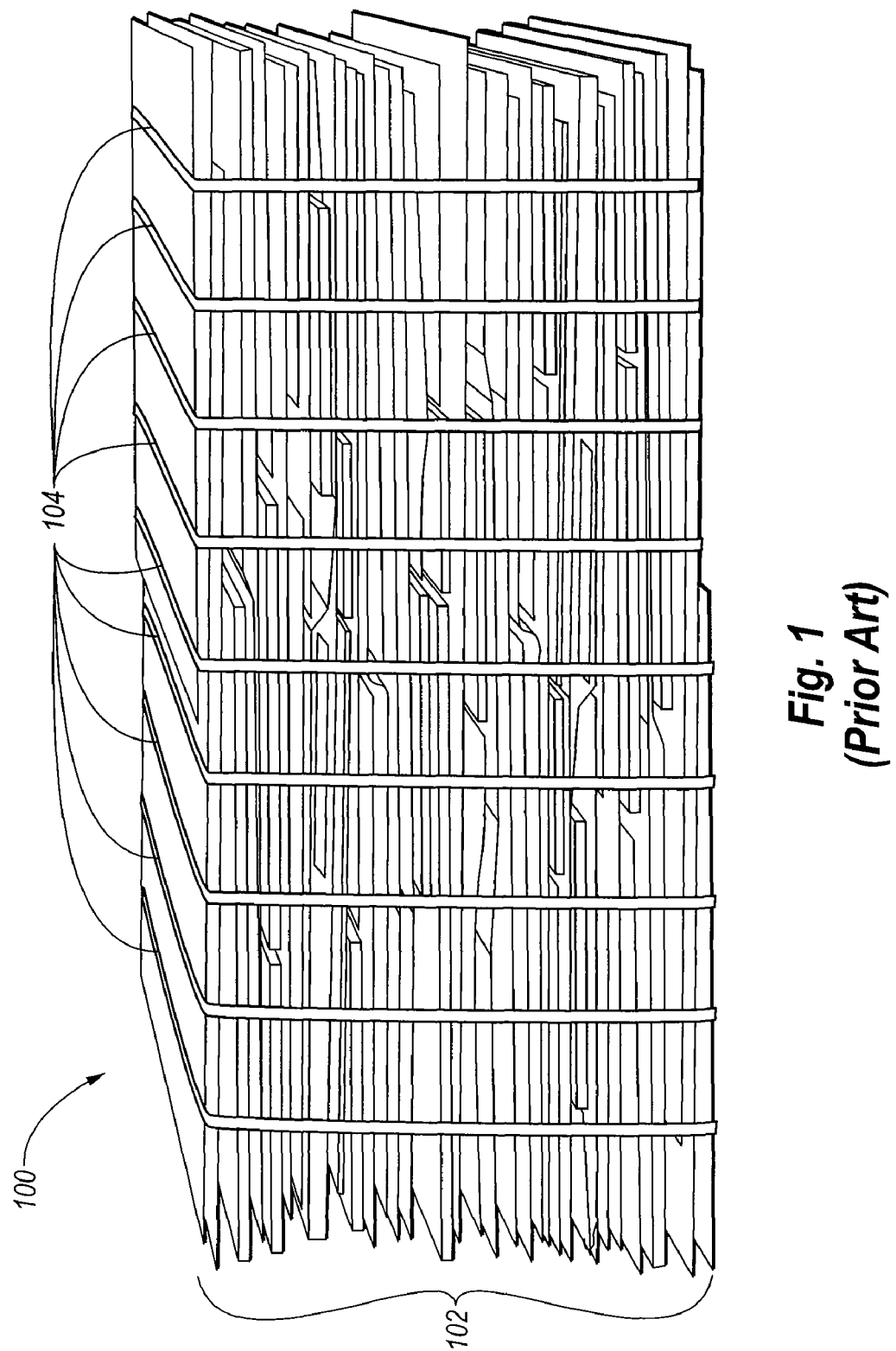
FIG. 1 illustrates a cardboard bale according to the prior art.
Figure 4:
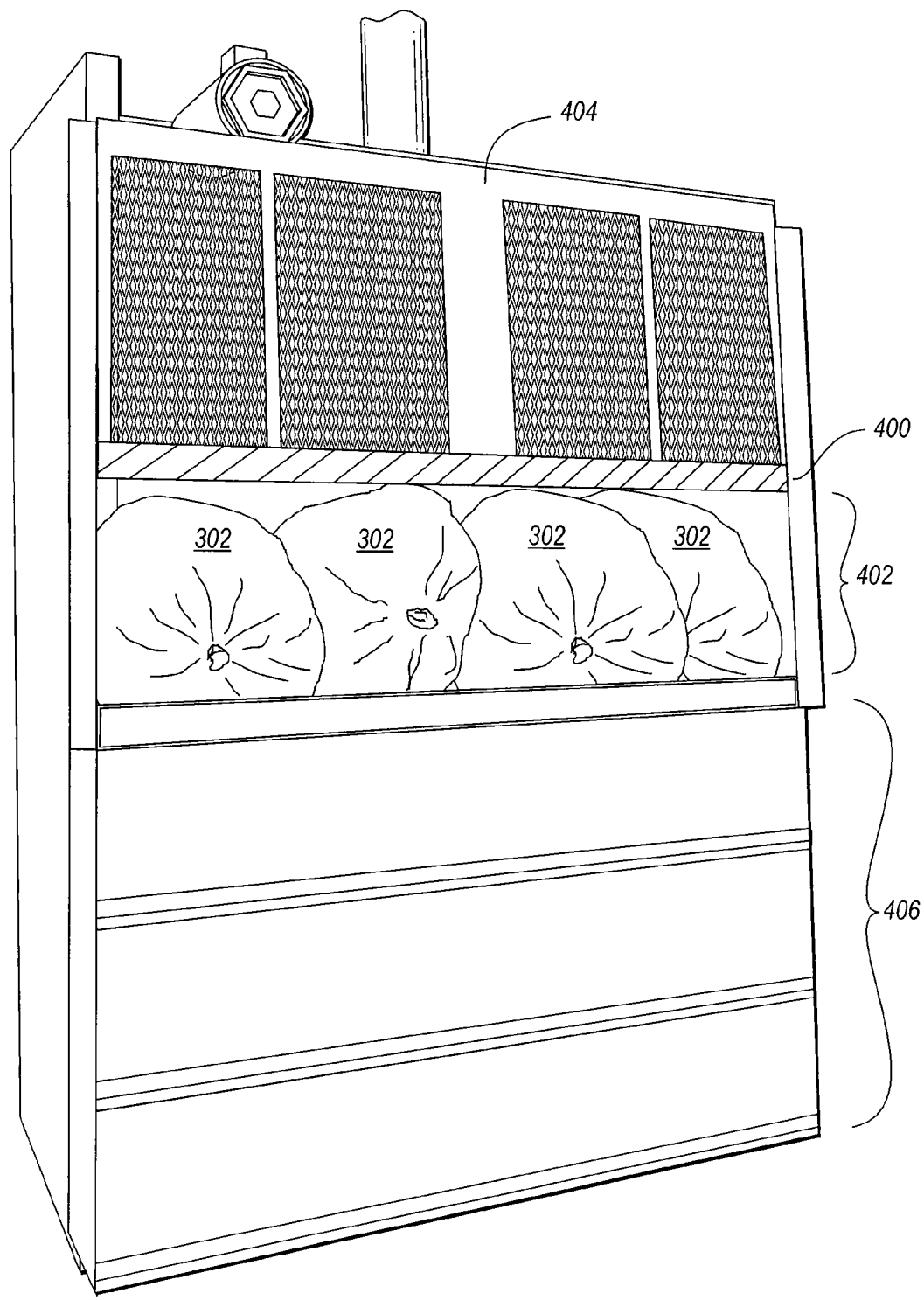
FIG. 4 illustrates the insertion of recyclable plastic film into a cardboard baler for forming a plastic/cardboard bale according to embodiments of the invention.

Referring now to FIG. 1, a conventionally formed cardboard bale 100 includes a compacted single layer 102 of cardboard. As depicted, the compacted cardboard bale 100 is bound together by bands 104 to keep the cardboard bale 100 in a compacted state. Cardboard bale 100 can be formed by a cardboard baler as generally depicted in FIG. 4 or any other suitable baler or device used to compact cardboard. Typically, the majority of the individual pieces of cardboard that form cardboard bale 100 come from the same product distribution activities that generate most recyclable plastic film.

As previously noted, it has been conventionally held that cardboard cannot be mixed with plastic film in collecting materials for recycling. More particularly, the chemical and mechanical processes for recycling cardboard and plastic film cannot work if both are present. It has therefore been axiomatic that cardboard bales, such as bale 100, cannot contain any plastic film or the whole bale must be discarded. This is because not only can the materials not be mixed in recycling processes, but the cost of separating plastic film from cardboard is too high for cost-effective recycling. As a result, mixed cardboard and plastic bales have heretofore been discarded as waste.

Figure 2:
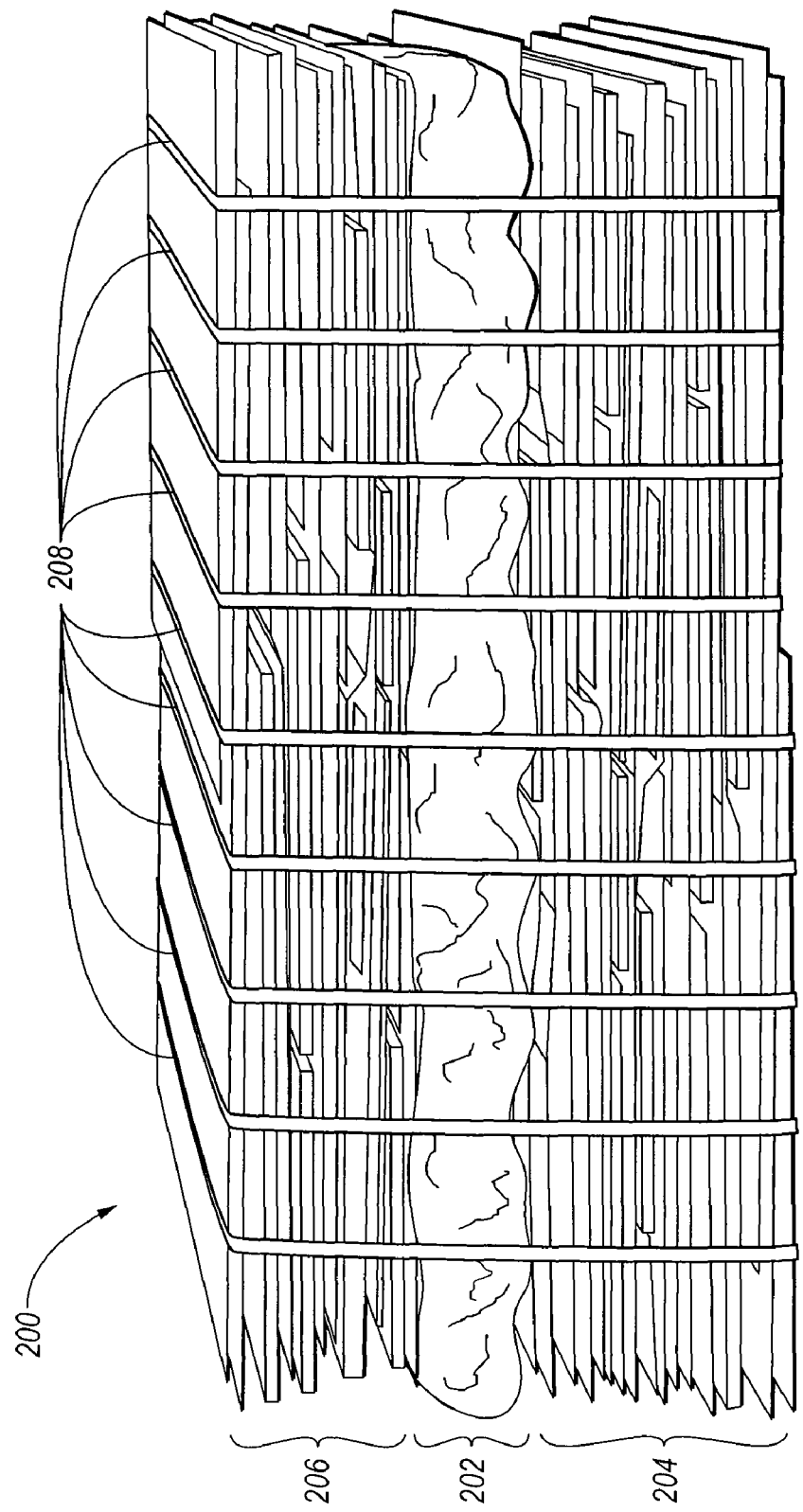
FIG. 2 illustrates a plastic/cardboard bale according to one embodiment of the invention.

Contrary to this conventional thinking, however, it has been surprisingly found that plastic film can be effectively combined with cardboard in forming a combined cardboard and plastic film bale. As generally depicted in FIG. 2, one embodiment of such a combined cardboard and plastic film bale 200 incorporates a first layer 204 of cardboard, a layer 202 of plastic film, and a second layer 206 of cardboard. The plastic film layer 202 is in effect sandwiched between the two cardboard layers 204, 206. The compacted plastic/cardboard bale is bound together by bands 208.

It can be readily seen in FIG. 2 how a significant amount of plastic film has been compacted to a very small space in the plastic/cardboard bale. In addition, it is also apparent that a significantly less amount of plastic is used in this plastic/cardboard bale than if the entire bale were formed of only plastic film. Thus, because a smaller amount of plastic film can be compacted in a single bale, the plastic can be disposed of in a timely fashion from a single location. In contrast, if the plastic were required to fill the entire bale, it would require many days, weeks, or even months to fill a single bale, requiring great expense to store a significant amount of uncompacted plastic.

Figure 3:
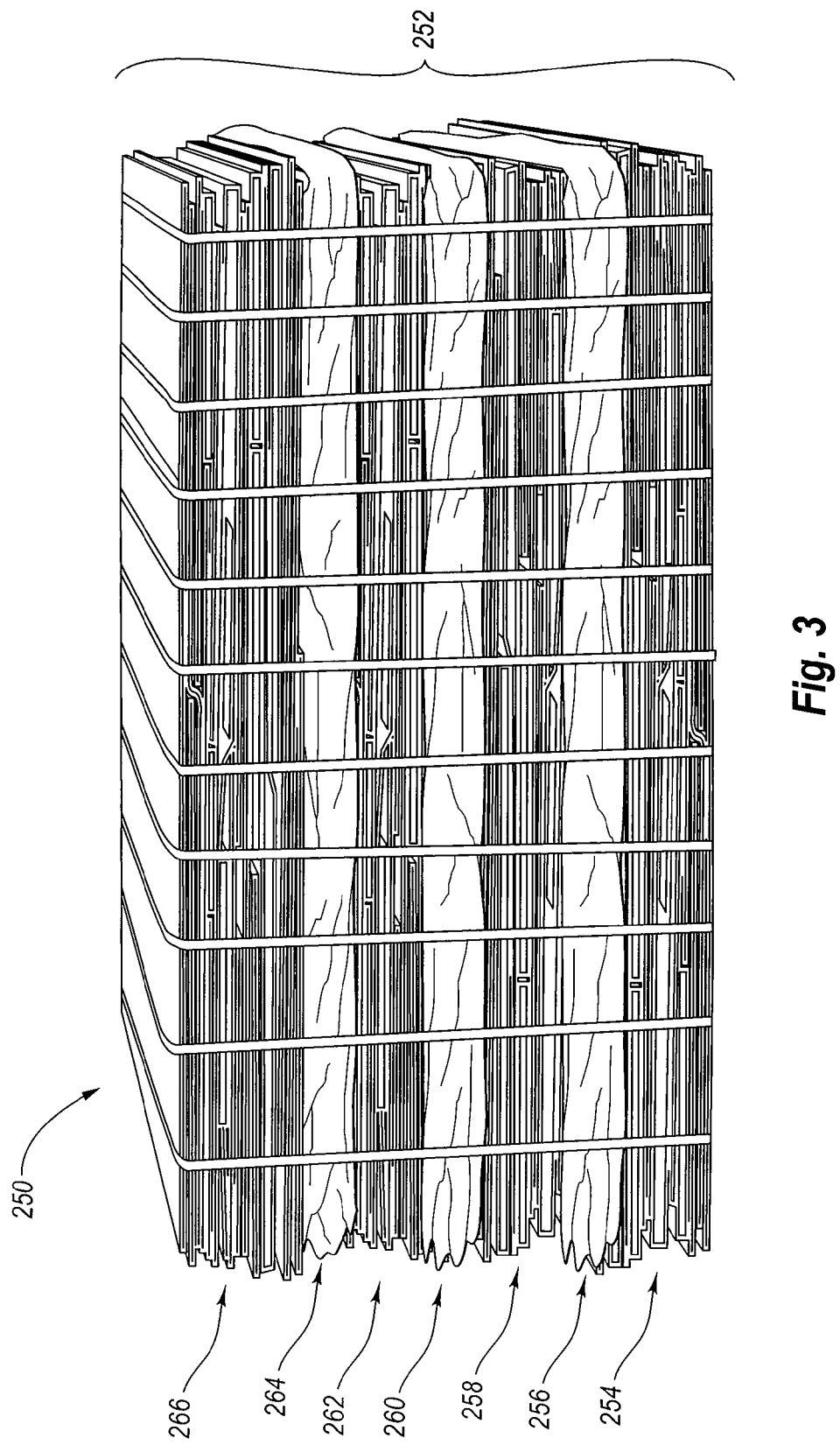
FIG. 3 illustrates a plastic/cardboard bale according to another embodiment of the invention.

Although it is preferred to have cardboard layers both above and below the plastic film layer, other embodiments of the invention may use only a single cardboard layer on one side of a plastic film layer. Alternatively, a plastic/cardboard bale may have numerous layers. For example, FIG. 3 illustrates several plastic film layers 256, 260, 264 sandwiched between several cardboard layers 254, 258, 262, 266 to form a plastic/cardboard bale having a thickness 252. Of course, one skilled in the art, in view of the disclosure herein, could configure a plastic/cardboard bale with any number of layers of plastic and cardboard. The limiting factor is that the thickness of each plastic layer and the number of such plastic layers must be cost effective. This use of numerous plastic film layers may be preferable in locations where there is little storage space for loose plastic or cardboard and so it is desirable to frequently compact the on hand loose plastic and cardboard in multiple layers.

With reference now to FIG. 4, a conventional cardboard baler 400 is used to form plastic/cardboard bales according to embodiments of the invention. Using conventional cardboard balers greatly reduces the cost to retailers and distributors that already have the balers on-site in that they do not have to acquire another machine nor do they have to store two machines, one for cardboard and one for plastic. The construction and operation of conventional cardboard balers, such as for example cardboard baler 400, is well known in the art and will not be described in great detail herein. Most conventional balers are designed to form 48 inch, 60 inch, or 72 inch bales.

Generally, it can be seen that cardboard and plastic can each be inserted through a top opening 402 while a gate 404 is in the open position. In the illustration, a series of bags 302 containing plastic film have been inserted into the baler. Although not visible in the illustration, a layer of compacted cardboard of preferably twelve to eighteen inches is already formed below the uncompacted plastic bags 302. After the gate 404 is closed, the baler 400 can then be operated to compact the plastic bags 302 into a compacted plastic film layer over the previously compacted cardboard layer. It is preferably to load and compact several cycles of plastic bags, for example eight to twelve, to form an ideally sized plastic film layer. For example, a preferred plastic film layer will be from about nine inches to about eighteen inches in thickness.

Figure 5:
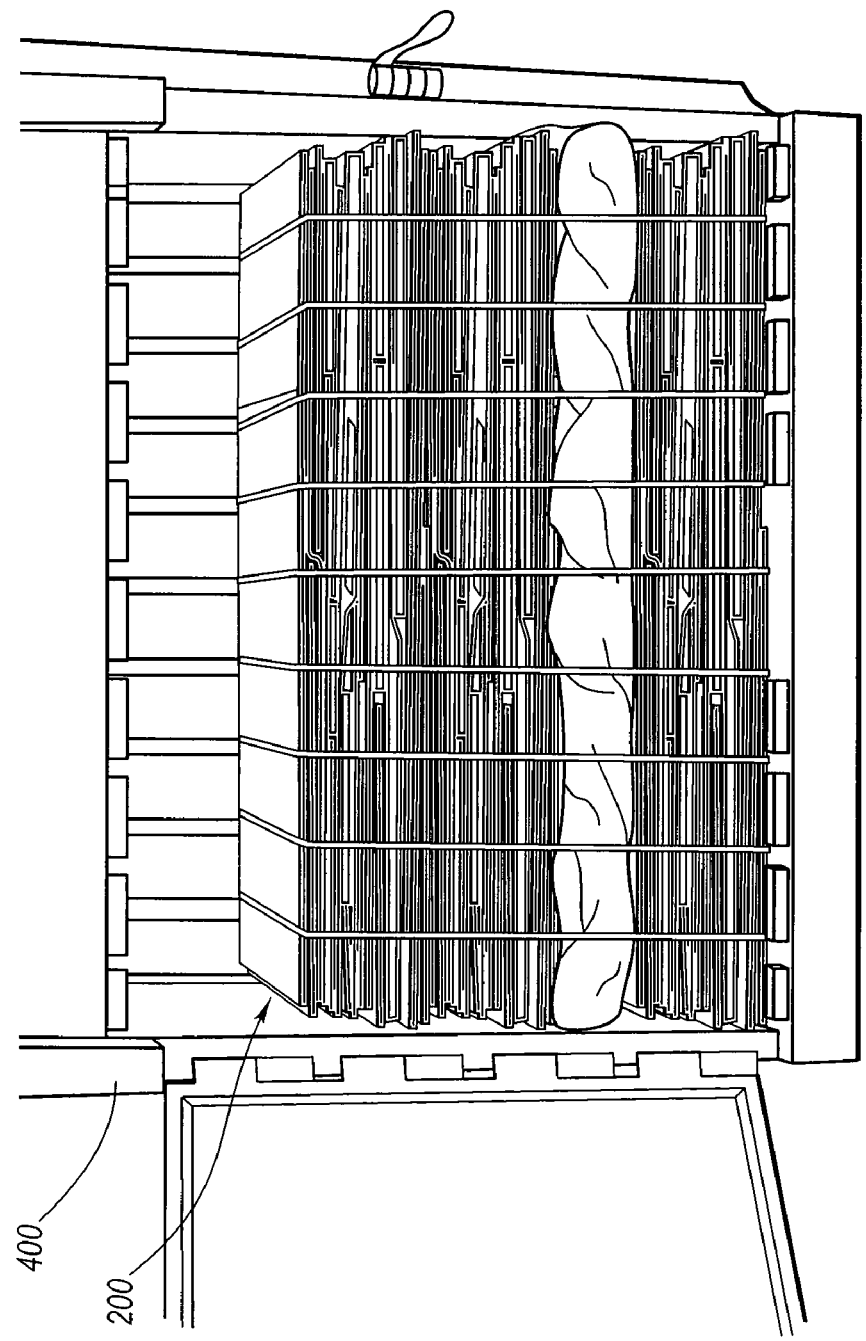
FIG. 5 illustrates a plastic/cardboard bale formed in a cardboard baler according to embodiments of the invention.

After the plastic film layer is formed, an operator preferably inserts a cycle of cardboard and then operates baler 400 to compress a layer of cardboard over the plastic film layer. This top layer may be formed over several load cycles and preferably has a thickness of twelve to eighteen inches. Finally, the finished bale is bound, preferably with wire in contrast to conventional plastic bands, to keep it compacted and then ejected from the baler 400. Preferably the bales have two wires at each end to further bind the bales. FIG. 5 illustrates a completed and bound bale 200 seated within the bottom portion of baler 400. Alternatively, as illustrated in FIG. 3 and previously discussed, multiple layers of plastic film can be formed within a single bale and top or bottom cardboard bales can be omitted. These embodiments are less preferred, however.

Figure 6:
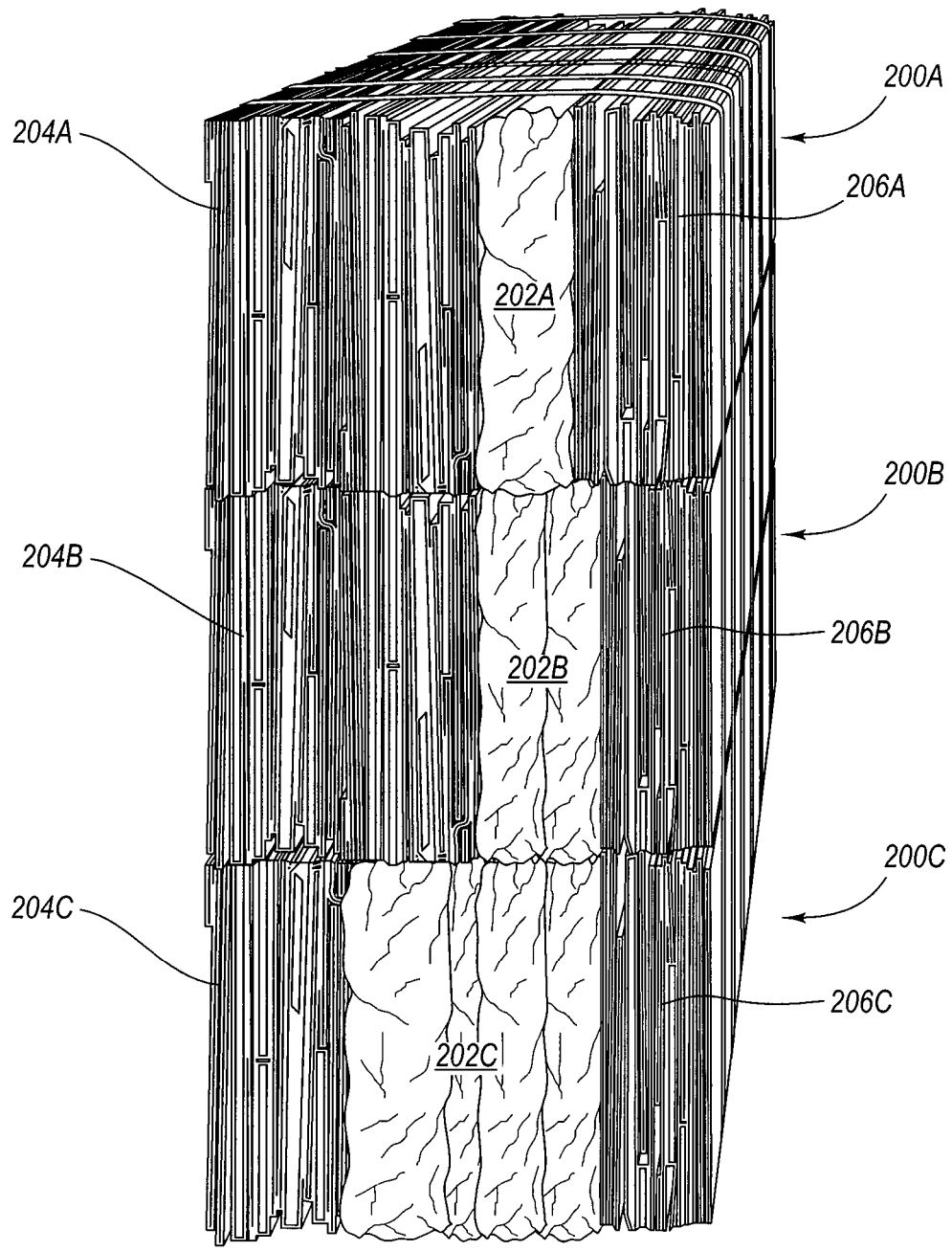
FIG. 6 illustrates a series of plastic/cardboard bale stacked for storage according to another embodiment of the invention.

Referring now to FIG. 6, forming stacks of plastic/cardboard bales 200A-C is important in the recycling industry because it allows for economy of storage and transport efficiency. Completed plastic/cardboard bales 200A-C are typically stored for a time at distribution and recycling centers, as seen in FIG. 6, stacked on top of one another to conserve space. During transport to these locations, bales are typically stacked on top of one another on a flat-bed trailer. As the trailers travel, turn corners, bounce, etc., the need for increased stability is important as bales shift and tend to lose their structural integrity. The weight of these bales is often over one thousand pounds, accentuating the tendency of the bales to shift and lose structural integrity.

The structure of the inventive bales is particularly beneficial in that having cardboard layers 204A-C, 206A-C sandwich plastic layers 202A-C forms structural bookends that allow the bales to maintain form and be transported safely and effectively. In other words, whereas the plastic layers are not strong enough to effectively stack perpendicularly on their own, the cardboard end layers provide excellent structural integrity so the bales can be stacked perpendicular to gravity without collapsing. The top and bottom cardboard layers 204A-C, 206A-C therefore preferably each have a thickness of at least about twelve inches to provide good support, but as few as six inches or even three inches may also be used in some embodiments.

In addition, the cardboard ends of the plastic/cardboard bales allow the bales to be tightly secured by straps tightened by a winch on a flat-bed trailer without the force of the straps breaking the bales part.

Accordingly, one embodiment of the invention is a method of transporting or storing plastic/cardboard bales by stacking two or more plastic/cardboard bales, wherein each of the bales has a cardboard layer, perpendicular to the stack, on each end of each bale such that the bales do not lose structural integrity and do not collapse. Such cardboard layers preferably have a thickness of least about three inches, more preferable at least about six inches, still more preferably at least about twelve inches.

In addition to providing structural support, the top and bottom cardboard layers 204A-C, 206A-C also help contain loss of debris when the bales 200A-C are transported on an open flat-bed trailer. Cardboard is less likely to pull loose in the wind than plastic and so having cardboard at the end pieces reduces the likelihood of plastic being pulled loose. The cardboard layers are also beneficial when the bales are stored on the ground in that the cardboard absorbs water, reducing the amount of water entering the plastic.

One example process of implementing the invention involves first gathering recyclable plastic film to a single location. Such plastic may include plastic generated on-site, for example plastic shrink wrap or plastic garment bags removed from clothing prior to sale. Plastic may also be gathered from other locations. For example, a collection location may have a plastic bag collection program wherein consumers can return their small plastic grocery or shopping bags for recycling. In addition, plastic bags can be collected throughout a community, such as at local schools, to promote recycling and thereby provide the double effect of providing a revenue stream for the store (sales of recyclable plastic) and by generating community goodwill.

Figure 7:
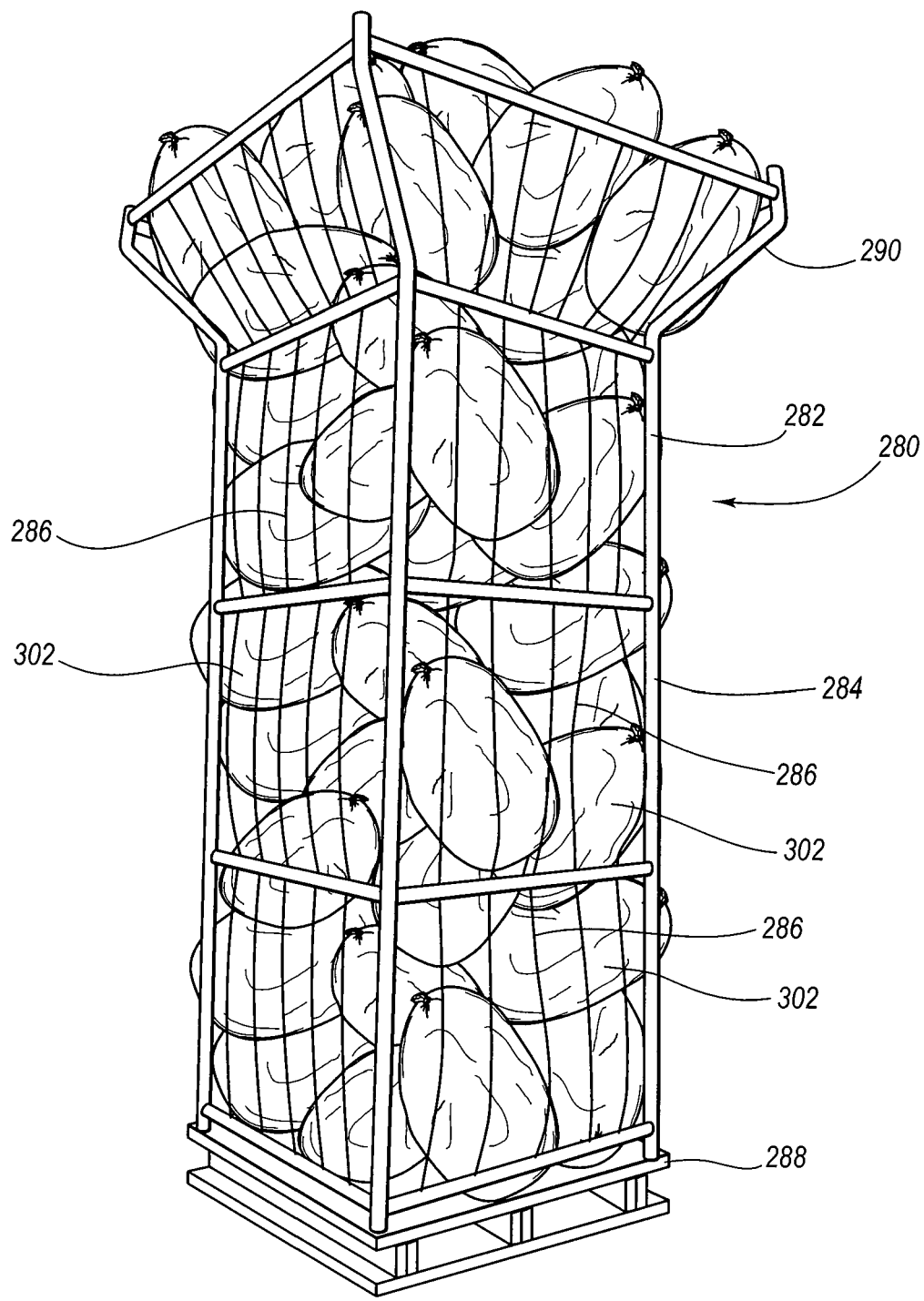
FIG. 7 illustrates a bin for storing recyclable plastic prior to its compacting in a plastic/cardboard bale according to another embodiment of the invention.
Figure 8:
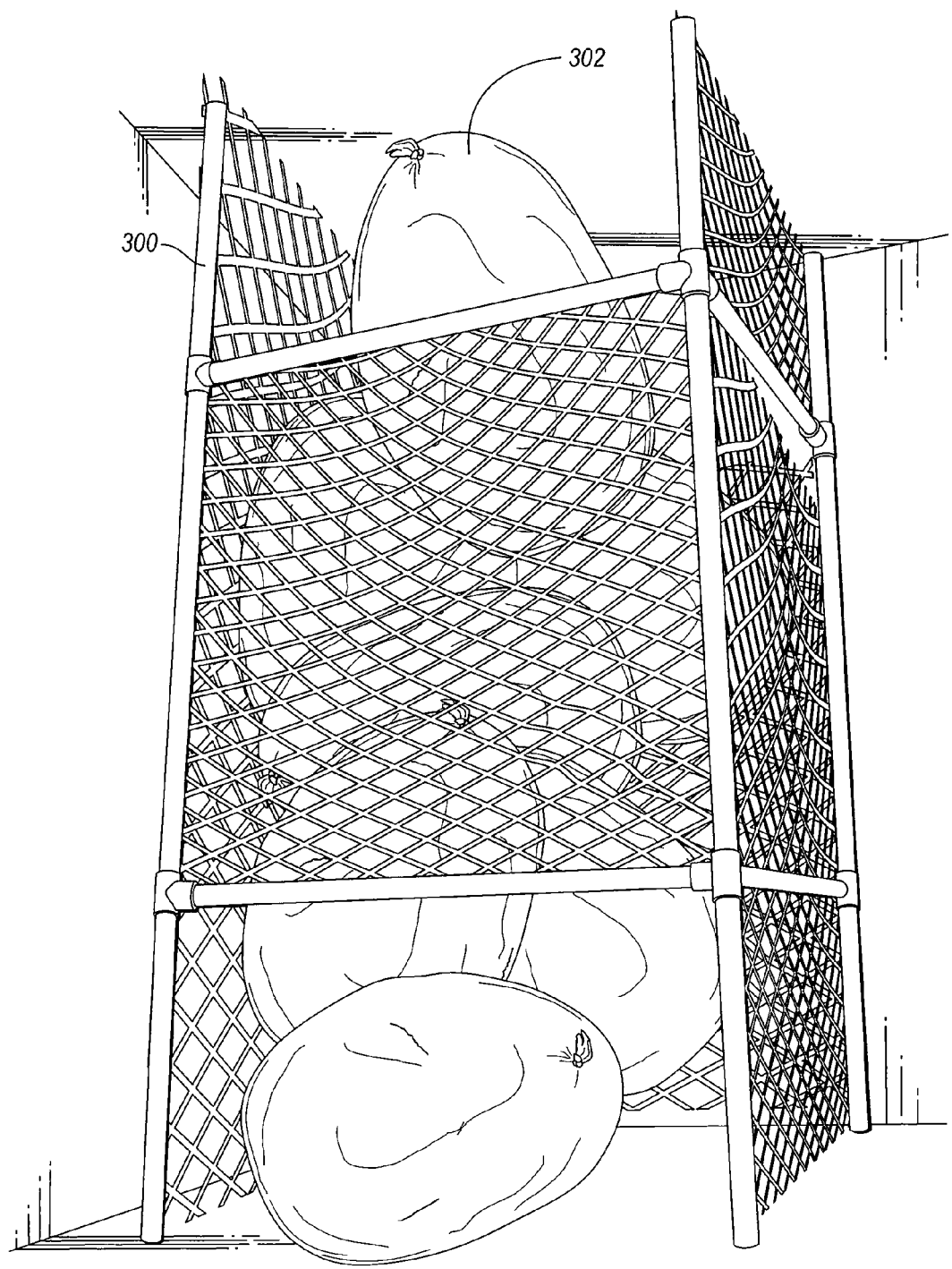
FIG. 8 illustrates another bin for storing recyclable plastic prior to its compacting in a plastic/cardboard bale according to another embodiment of the invention.

The gathered plastic film must then be stored for a brief period of time. Storing recyclable plastic according to one embodiment of the invention includes providing a specially designed collection area. As seen in FIGS. 7 and 8, such a collection area may be for example a tall narrow ball bin 280, 300 similar to those currently used to store large rubber balls and the like. Within a ball bin 280, 300 a plurality of single plastic bags 302, such as a garbage bags, are filled with shrink wrap and other accumulated plastic. The plastic bags 302 are preferably themselves recyclable plastic film bags having other recyclable plastic film therein.

A ball bin 280, 300 can be conveniently located near a cardboard baler so that bags 302 of plastic film can be stored vertically to minimize occupied floor space. The ball bins can also be formed or placed on a pallet 288 or wheeled dolly so it can be moved as desired. In the embodiment of FIG. 7, the ball bin 280 can have a lightweight frame 282, for example formed of PVC. The depicted ball bin has a funneled top opening 290 and plurality of bungee cords or ropes 286 that keep bags 302 from falling out. For storage, the plastic bags can be either tossed in through the funneled top opening or pushed between the movable bungee retainer cords 286. The bags can then be removed for compacting by pulling them through the movable bungee retainer cords 286. In the depicted embodiment of FIG. 8, in another example the ball bin also be a metal cage having top and bottom openings where the plastic bags 302 can be tossed in and removed.

The bags of plastic are preferably stored in a ball bin until it is completely full. That volume of plastic is then loaded into the baler over a series of compacting cycles to make a plastic/cardboard bale. It has been determined that one bin of approximately 4 feet in width, 4 feet in depth, and ten feet in height can hold the plastic generated over two to three days by a typical large retail store or discount warehouse.

It is preferable to make each plastic layer as thick as possible to reduce the number of plastic/cardboard bales. Fewer plastic/cardboard bales is preferable since it reduces the number of bales that need to be specially handled. It is estimated that large retail stores using a ball bin as describe herein to store plastic film will generate approximately one plastic/cardboard bale for every eight or nine cardboard bales.

Upon formation of a plastic/cardboard bale, such as for example plastic/cardboard bale 200 or plastic/cardboard bale 250. The plastic/cardboard bale can then be stored on-site until it is shipped to a plastic and cardboard processing center, optionally via other distribution locales such as returns centers. Because, the plastic film has been compacted in the plastic/cardboard bales, it takes up the less space in a trailer or other transportation vehicle as a similar weight of loosely gathered plastic film.

At the downstream plastic and cardboard processing center the bale is separated into its constituent parts, for example first cardboard layer 204, plastic layer 202, and second cardboard layer 206. Because the plastic film in the plastic/cardboard bale is contiguous, the compact plastic layer can be easily and readily removed and isolated for recycling. Thus, neither the plastic nor the cardboard is contaminated by the other.

Cardboard balers typically form bales that are about forty-eight inches tall, about sixty to seventy-two inches wide, and about thirty inches deep. A single plastic layer, in turn, may comprise from about three inches to about thirty-six inches or more in height. Alternatively, the layer of plastic film can be described as being at least about 5% of the bale thickness, more preferably from about 10% to about 70% of the bale thickness. While less than about 3 inches, or less than about 5%, can z be used in embodiments of the invention, unless the price per pound for recyclable plastic film becomes very high it is significantly less financially feasible to process a bale to collect such a relatively small volume of plastic. In addition, having at least about 30% cardboard in each bale helps ensure sufficient rigidity for bale stability and containment or plastic.

A lower cardboard layer will preferably be from about 5% to about 95% of the bale thickness, more preferably about 75% of the bale thickness. The optional top cardboard layer is preferably thinner than the bottom cardboard layer such that it can be more easily removed when the bale is disassembled. A top cardboard layer thickness of about three to twelve inches, more preferably about six inches to about nine inches, is therefore preferred. Although not necessary, the use of the top cardboard layer is preferred as it helps keep the bale more compact and intact than it would be if plastic film were on the top of the bale.

Of course, the denotations of top and bottom are interchangeable and the bales can be formed in an inverse manner to that described hereinabove.

Various approaches can be used to track the weight of plastic film that is pressed into each plastic/cardboard bale. One efficient manner of keeping track of the volume of plastic that is compacted in each bale is simply to measure the thickness of each plastic layer and multiply that thickness times other known constants such as the dimensions of the bale to determine an approximate plastic volume. This number is particularly helpful for use in determining the value of the plastic that has been recovered.

For example, it is currently known that every three inches of compacted plastic film in a 60" by 48" by 30" bale weights about 50 pounds. A 72" by 48" by 30" bale, in turn weights about 65 pounds. Thus, upon the formation of the bale the thickness of the plastic film layer can be approximately measured in inches and a weight estimate can be made.

Alternatively, the thickness of the plastic film layer can be estimated as a fraction of the bale thickness. Regardless, the entire bale can also be weighed so that the correct fractional portion of the load is assigned to the plastic film layer. Past measurements of separated bales as well as the known densities of plastic and cardboard can be used to create tables that indicate any adjustments to these estimates if more precise estimates are desired.

At the plastic and cardboard processing center, the whole bales can be again weighed. After the bales are broken open and the plastic is separated from cardboard the plastic can once more be weighed to get a final accurate measurement of the recovered plastic film. Of course, not all of these measurements may be necessary depending upon the accuracy and tracking that is desired.

After sorting the cardboard and plastic, each of the cardboard and plastic can be baled separately and shipped either on truck or rail car to paper and plastic consuming manufacturers throughout the country.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for collecting recyclable plastic and for forming a layered bale of compressed recyclable materials, comprising:
    filling and storing each of a plurality of plastic bags with recyclable plastic;
    using a baler to form a first compressed cardboard layer within a baler by positioning cardboard within the baler and by compressing the cardboard within the baler;
    subsequent to forming the first compressed cardboard layer, using the baler to form a compressed recyclable plastic film layer directly on top of the first compressed cardboard layer by positioning the plurality of filled plastic bags on the first compressed cardboard layer within the baler and by compressing the plurality of filled plastic bags within the baler; and
    using the baler to form a second compressed cardboard layer within the baler by positioning additional cardboard within the baler, directly above the compressed recyclable plastic film layer, and by compressing the additional cardboard within the baler; and
    binding the first compressed cardboard layer, the compressed recyclable plastic film layer and the second compressed cardboard layer with binding materials into a bound and layered bale having a width and length, the compressed recyclable plastic film layer being visible along substantially the entire width and the entire length of the bound and layered bale subsequent to being compressed by the baler and being bound between the first and second compressed cardboard layers.

2. The method recited in claim 1, wherein the method further includes shipping the bound and layered bale to a distribution and recycling center where the bound and layered bale is unbound and the compressed recyclable plastic film layer is separated from the first and second compressed cardboard layers.

3. The method recited in claim 1, wherein filling and storing the plurality of plastic bags includes the following:
    providing a container configured for holding the plurality of filled plastic bags; and
    filling the container with the plurality of plastic bags.

4. The method recited in claim 3, wherein the container comprises a ball bin that vertically stacks the plurality of plastic bags.

5. The method recited in claim 1, wherein the recyclable plastic comprises plastic film composed of plastic bags and recyclable plastic sheets.

6. The method recited in claim 1, wherein the first compressed cardboard layer has a thickness of at least three inches and is formed by compressing several individual pieces of cardboard together during one or more compression cycles within the baler and until the first compressed cardboard layer is at least three inches thick.

7. The method recited in claim 6, wherein the first compressed cardboard layer has a thickness of at least twelve inches.

8. The method recited in claim 7, wherein the first compressed cardboard layer has a thickness of at least eighteen inches.

9. The method recited in claim 1, wherein the compressed recyclable plastic film layer has a thickness of at least nine inches and is formed by loading and compacting several cycles of plastic bags within the baler.

10. The method recited in claim 9, wherein the compressed recyclable plastic film layer has a thickness of at least eighteen inches and is formed by loading and compacting several cycles of plastic bags within the baler.

11. The method recited in claim 1, wherein the compressed recyclable plastic film layer is formed by loading and compacting between eight and twelve cycles of plastic bags within the baler.

12. The method recited in claim 1, wherein the compressed recyclable plastic film layer is formed by loading and compacting between at least eight and twelve plastic bags within the baler.

13. The method recited in claim 1, wherein the second compressed cardboard layer has a thickness of at least three inches and is formed by compressing several individual pieces of cardboard together during one or more compression cycles within the baler and until the first compressed cardboard layer is at least three inches thick.

14. The method recited in claim 13, wherein the second compressed cardboard layer has a thickness of at least twelve inches.

15. The method recited in claim 14, wherein the second compressed cardboard layer has a thickness of at least eighteen inches.

16. The method recited in claim 1, wherein the method further includes forming an additional compressed recyclable plastic film with the baler, directly above the second compressed cardboard layer, and prior to binding the bound and layered bale.

17. The method recited in claim 16, wherein the method further includes forming a third compressed cardboard layer with the baler, directly above the additional compressed recyclable plastic film, and prior to binding the bound and layered bale.

18. A method for collecting recyclable plastic and for forming a layered bale of compressed recyclable materials, comprising:
    filling and storing each of a plurality of plastic bags with recyclable plastic;
    compressing several pieces of cardboard in a baler during a first plurality of compression cycles until a first compressed cardboard layer is formed;
    loading and compressing the plurality of plastic bags within the baler during a second plurality of compression cycles until a compressed recyclable plastic film layer is formed directly on top of the first compressed cardboard layer and that extends an entire length and an entire width of the first compressed cardboard layer;
    compressing several additional pieces of cardboard in the baler during a third plurality of compression cycles until a second compressed cardboard layer is formed directly on top of the compressed recyclable plastic film layer; and
    binding the first compressed cardboard layer, the compressed recyclable plastic film layer and the second compressed cardboard layer together as a bound and layered bale having a width and a length, with each of the first and second compressed cardboard layers and the compressed recyclable plastic film layer being visible along substantially the entire length and the entire width of the bound and layered bale subsequent to said compressing of the plastic bags into the compressed recyclable plastic film layer by the baler and subsequent to binding the compressed recyclable plastic film layer between the first and second compressed cardboard layers.

* * * * *